(12) United States Patent
Tanase (10) Patent No.: US 6,169,445 B1
(45) Date of Patent: Jan. 2, 2001

(54) CURRENT MODE TRANSMITTER

(75) Inventor: Gabriel E. Tanase, Cupertino, CA (US)

(73) Assignee: Maxim Integrated Products, Inc., Sunnyvale, CA (US)

( * ) Notice: Under 35 U.S.C. 154(b), the term of this patent shall be extended for 0 days.

(21) Appl. No.: 09/312,905

(22) Filed: May 17, 1999

(51) Int. Cl.[7] .................................................. G05F 1/10
(52) U.S. Cl. ............................ 327/538; 327/108; 327/543
(58) Field of Search .................................. 327/538, 108, 327/543, 540, 541, 101; 326/82, 83

(56) References Cited

U.S. PATENT DOCUMENTS 5,568,084 * 10/1996 McClure et al. ...................... 327/538

* cited by examiner

Primary Examiner—David Nelms
Assistant Examiner—David Lam

(74) Attorney, Agent, or Firm—Hickman Coleman & Hughes, LLP (57) ABSTRACT

A current mode transmitter is provided including a charge circuit connected to an enable node and adapted to generate a charge current upon the receipt of an activation signal at the enable node. Also included is a discharge circuit connected to the enable node and adapted to generate a discharge current upon the cessation of the receipt of the activation signal at the enable node. An output circuit is connected between an output node and the charge and discharge circuits. The output circuit serves for generating an output current at the output node in response to the charge current and the discharge current. Such output current is initiated within a first delay after the detection of the activation signal by the charge circuit. Further, the output current is terminated within a second delay after the detection of the cessation of the receipt of the activation signal by the discharge charge circuit. The first delay and the second delay are substantially similar such that a pulse width of the output current is substantially similar to a pulse width of the activation signal received at the enable node. The output current may thus be used to drive an infrared light emitting diode with very fast rise and fall times while maintaining tight control over the pulse width of the output current.

30 Claims, 5 Drawing Sheets

FIG. 1

(PRIOR ART)

CURRENT MODE TRANSMITTER

DESCRIPTION

1. Technical Field

The present invention relates to transmitters and more particularly pertains to a new current mode transmitter for driving an infrared light emitting diode with an output current which follows very closely an associated input pulse.

2. Background Art

Figure 1:
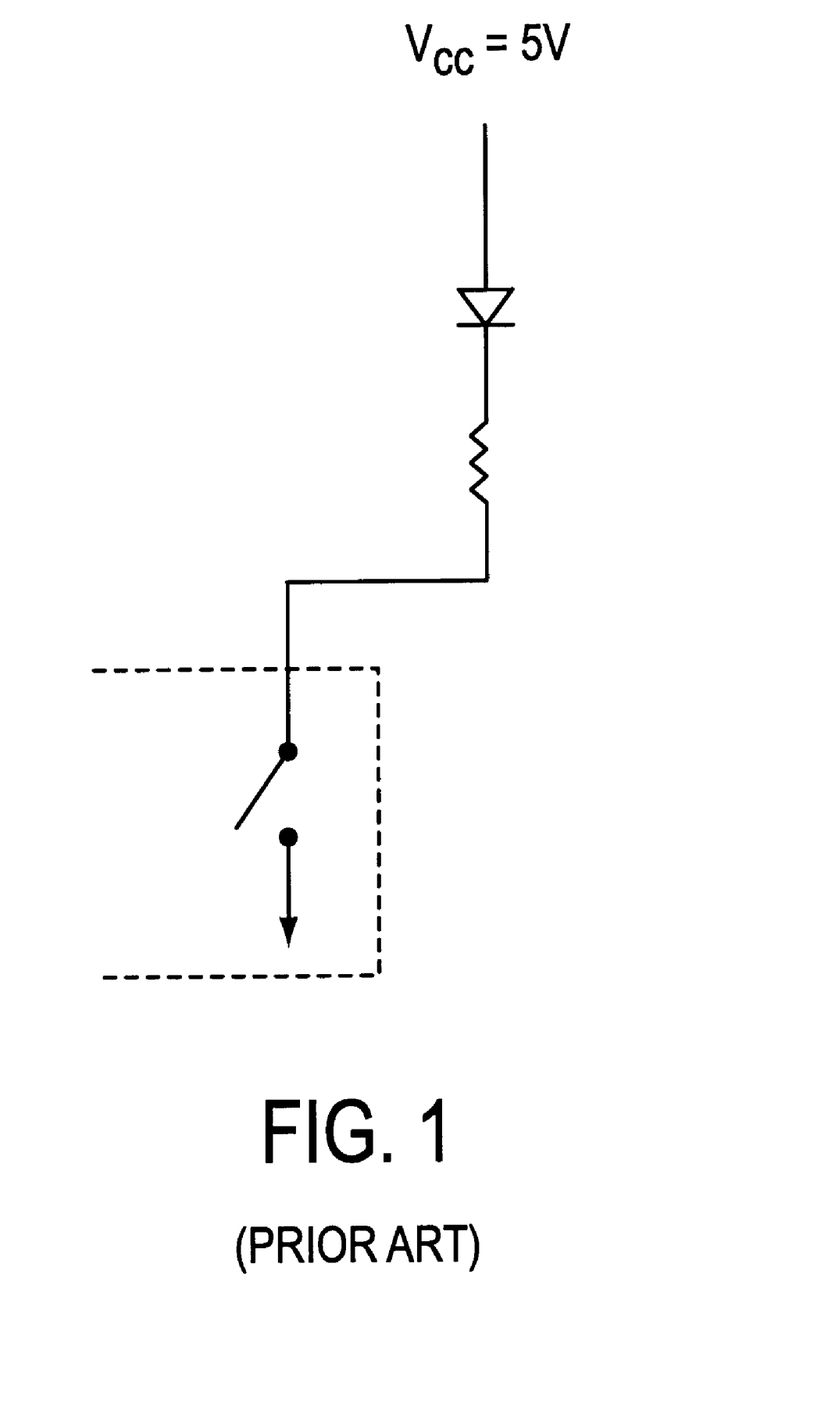
FIG. 1 is a schematic diagram of a prior art circuit for driving an infrared light emitting diode.

Known prior art transmitters include the circuit shown in FIG. 1. As shown, a controlled switch such as a transistor is connected to a ballast resistor. As is conventional, an infrared light emitting diode is connected between the ballast resistor and a voltage supply. In use, the switch is opened and closed in order to effect the transmission of light by the infrared light emitting diode. While the switch is closed and the infrared light emitting diode is illuminated, the resistor serves for limiting an amount of current that passes through the infrared light emitting diode. Due to the necessity of such resistor, a voltage supply in the order of 5V is required so that a sufficient voltage drop is present across the infrared light emitting diode. A problem thus arises when a reduced voltage supply of about 3.3V is desired. With this reduced voltage, an inadequate voltage drop is present across the infrared light emitting diode and the necessary presence of the resistor becomes problematic due to difficulties in tolerating the infrared light emitting diode forward voltage, supply voltage tolerance, and ambient temperature.

In these respects, the current mode transmitter according to the present invention substantially departs from the conventional concepts and designs of the prior art, and in so doing provides an apparatus primarily developed for the purpose of driving an infrared light emitting diode with an output current instead of a voltage as is the case in prior art devices.

SUMMARY OF THE INVENTION

In view of the foregoing disadvantages inherent in the known types of transmitters now present in the prior art, the present invention provides a new current mode transmitter circuit wherein the same can be utilized for driving an infrared light emitting diode with an output current which follows very closely an associated input pulse.

To attain this, a current mode transmitter is provided that includes a charge circuit connected to an enable node and adapted to generate a charge current upon the receipt of an activation signal at the enable node. Also included is a discharge circuit connected to the enable node and adapted to generate a discharge current upon the cessation of the receipt of the activation signal at the enable node. An output circuit is connected between an output node and the charge and discharge circuits. The output circuit serves for generating an output current at the output node in response to the charge current and the discharge current. Such output current is initiated within a first delay after the detection of the activation signal by the charge circuit. Further, the output current is terminated within a second delay after the detection of the cessation of the receipt of the activation signal by the discharge charge circuit. The first delay and the second delay are substantially similar such that a pulse width of the output current is substantially similar to a pulse width of the activation signal received at the enable node. The output current may thus be used to drive an infrared light emitting diode with very fast rise and fall times while maintaining tight control over the pulse width of the output current.

BRIEF DESCRIPTION OF THE DRAWINGS

The invention will be better understood when consideration is given to the following detailed description thereof. Such description makes reference to the annexed drawings wherein.

DISCLOSURE OF THE INVENTION

Figure 2:
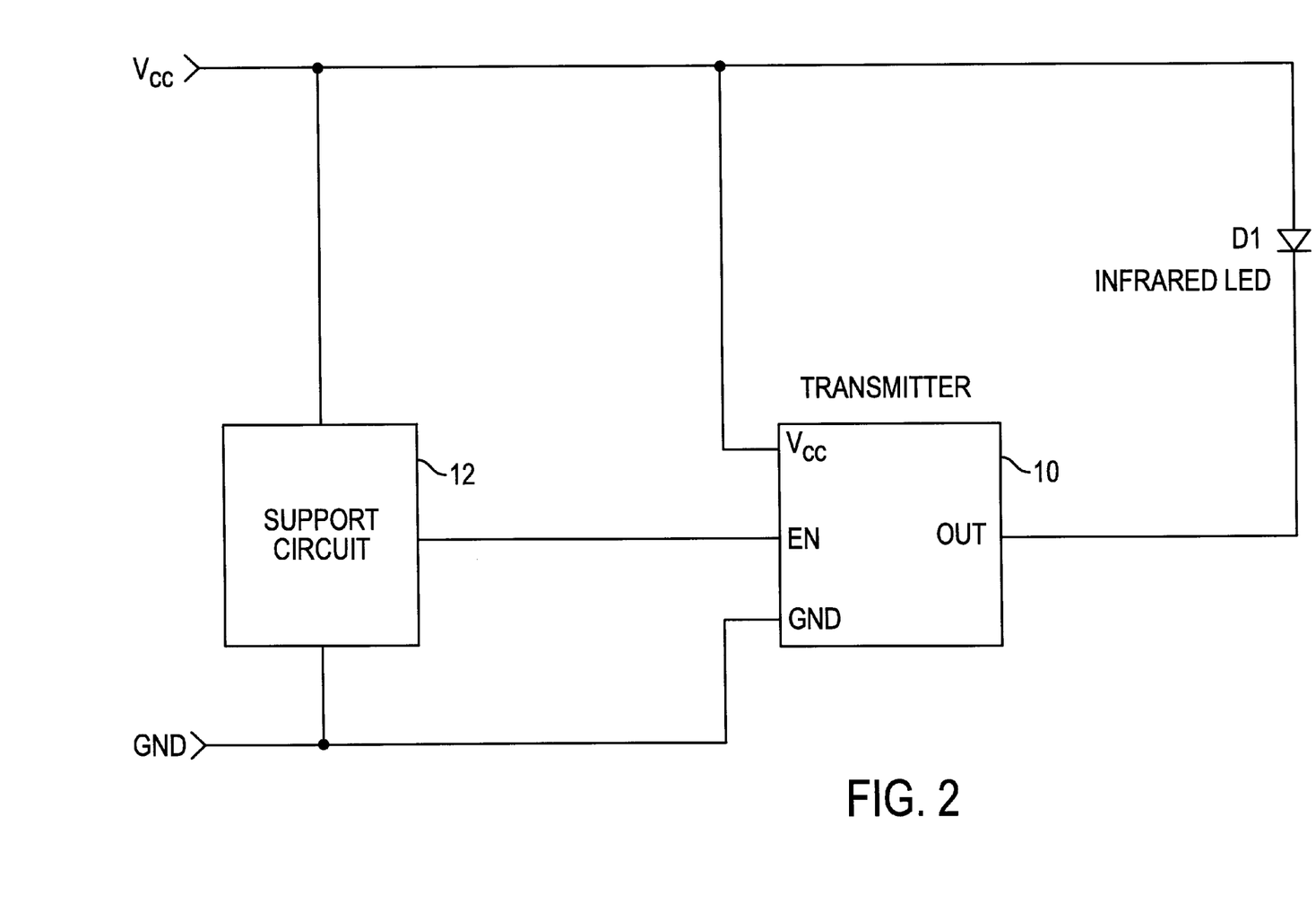
FIG. 2 is a general block diagram of the current mode transmitter connected to an associated support circuit and an infrared light emitting diode according to the present invention.

The present invention includes a current mode transmitter 10 that may be used in combination with an existing support circuit 12 for the purpose of driving an infrared light emitting diode D1 as a function of an activation signal received from the support circuit 12. Such support circuit 12 may take the form of an IrDA transceiver chip, MAXIM RS68, which is a part of a MAXIM hybrid module, MAX3125/MAX3126. See FIG. 2. Accordingly, the current mode transmitter 10 of the present invention may be tailored to meet the 4 ppm IrDA standard: at a 4 MHz data rate, the activation signal has a minimum pulse width of 125 ns. It is also important that the output current $I_{out}$ of the current mode transmitter be capable of following the pulse width of the support circuit 12 so that light emitted by the infrared light emitting diode D1 follows the activation signal within +/−10 ns and with fall and rise times of less than 40 ns. Since the present invention provides an output current as opposed to an output voltage and the need for a ballast resistor is obviated, a low supply voltage of merely 3.3V+/−5% may be used.

Figure 3:
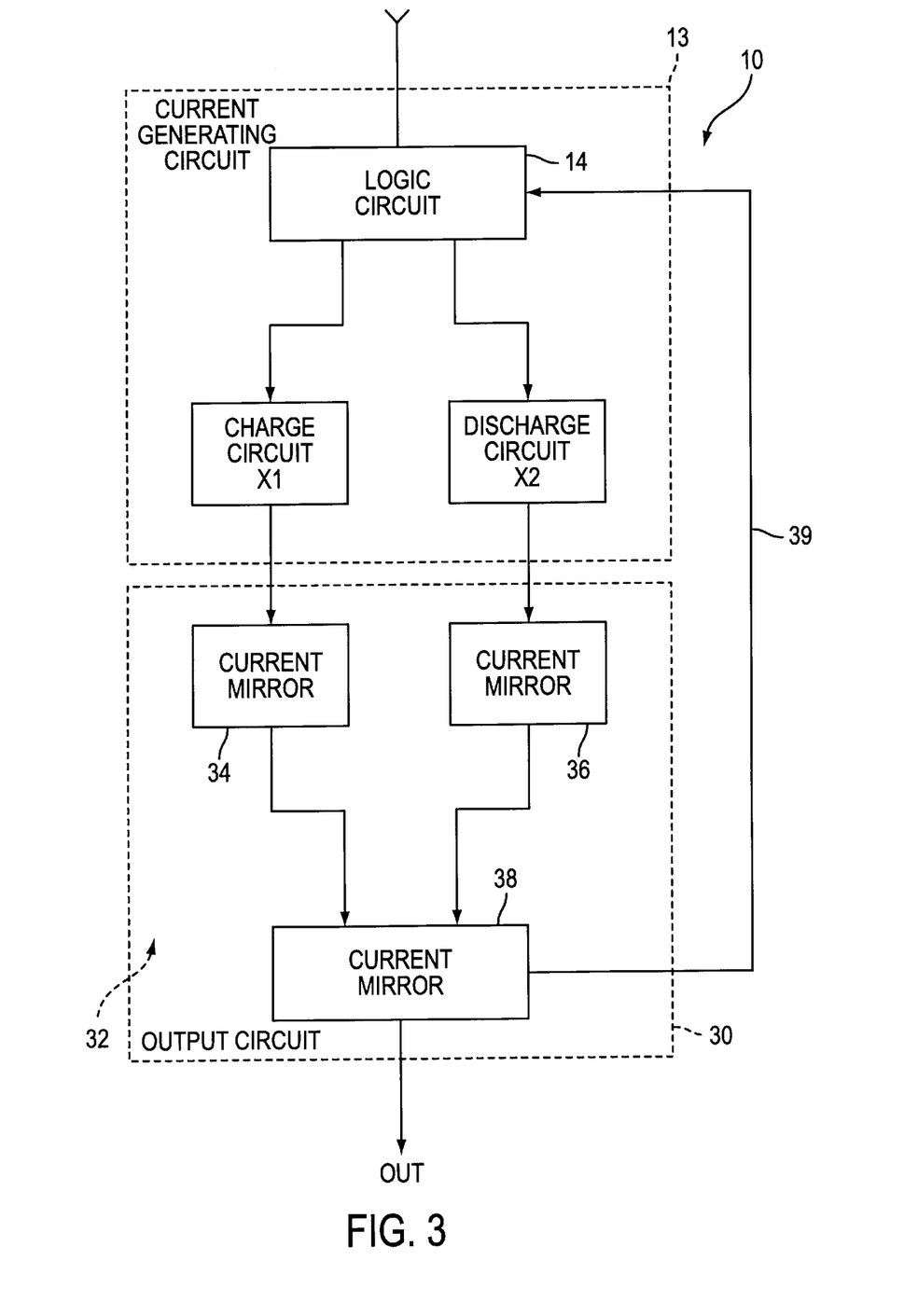
FIG. 3 is a more specific block diagram of the present invention shown in FIG. 2.

With reference now to FIG. 3, one embodiment of the current mode transmitter 10 is shown to include a current generating circuit 13 connected to an enable node and adapted to generate a first current upon the receipt of the activation signal at the enable node. Further, the current generating circuit 13 serves to generate a second current upon the cessation of the receipt of the activation signal at the enable node. As will soon become apparent, the output current $I_{out}$ is generated and terminated in response to the first and second currents.

More specifically, the current generating circuit 13 includes a charge circuit X1 having an input and an output. In use, the charge circuit X1 is adapted to generate at the output thereof a charge current $I_C$ of about 2 mA during the receipt of an "on" signal at the input thereof. During the receipt of an "off" signal at the input thereof, however, the charge circuit X1 remains idle.

Associated therewith is a discharge circuit X2 having an input and an output, similar to the charge circuit X1. The discharge circuit X2 is adapted to generate at the output thereof a discharge current $I_D$ of about 2 mA during the receipt of an "on" signal at the input thereof. Further, the discharge circuit X2 remains idle during the receipt of an "off" signal at the input thereof. For reasons that will be set forth hereinafter, the discharge circuit X2 is substantially identical to the charge circuit X1 in order that the charge and discharge circuits X1 and X2 exhibit substantially similar delays. To accomplish the foregoing, the charge and discharge circuits X1 and X2 may consist of substantially identical commonly known controlled current sources.

The current generating circuit 13 further includes a logic circuit 14 that works to control the operation of the charge and discharge circuits X1 and X2. Note FIG. 3. Such operation entails the charge circuit X1 receiving the "on" signal upon the receipt of the activation signal and the discharge circuit X2 receiving the "on" signal upon the cessation of the receipt of the activation signal.

Figure 4:
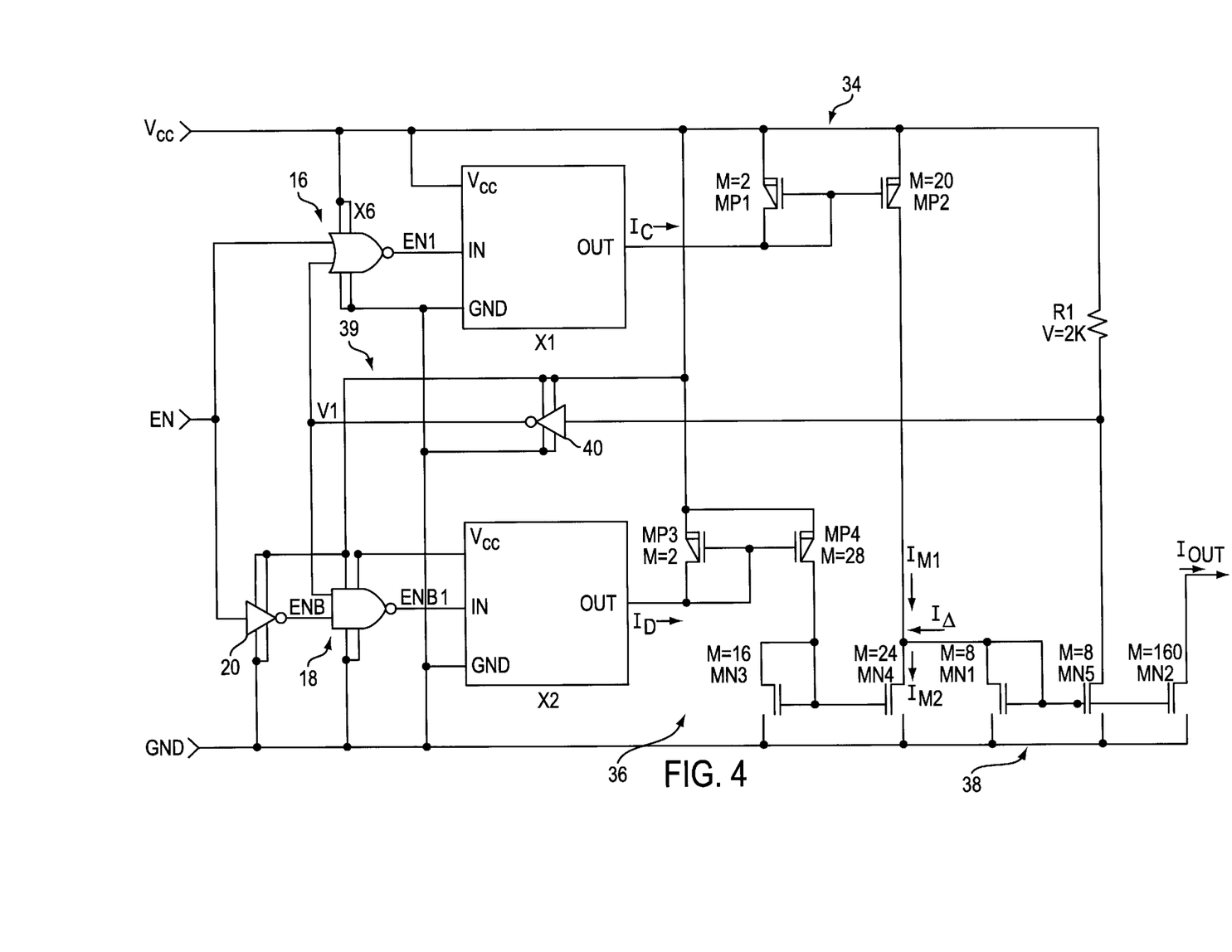
FIG. 4 is detailed schematic diagram of the present invention shown in FIG. 3.

To accomplish this, the logic circuit 14 includes a first digital circuit 16 comprising a NOR gate having an output connected to the input of the charge circuit X1. See FIG. 4. By this interconnection, the NOR gate serves for transmitting the "on" signal to the charge circuit X1 during the receipt of an activation signal on at least one of a pair of inputs thereof. In addition, the NOR gate functions to transmit the "off" signal during the lack of receipt of the activation signal on both of the inputs thereof. As shown in FIG. 4, a first input of the first digital circuit 16 is connected to an enable node EN and a second input of the first digital circuit 16 is connected to a feedback node V1.

Yet another component of the logic circuit 14 is a second digital circuit 18 which includes a NAND gate. As shown in FIG. 4, the NAND gate has a first input connected to the enable node EN via an inverter 20 and a second input connected to the feedback node V1. An output of the NAND gate is connected to the input of the discharge circuit X2 for transmitting the "on" signal to the discharge circuit X2 during the receipt of the activation signal on both of a pair of inputs thereof. In addition, the NAND gate functions to transmit the "off" signal during the lack of receipt of the activation signal on at least one or both of the inputs of the NAND gate. It should be noted that the activation signal may be selected as active-high, active-low, or any other type of signal for effecting the desired result.

Figure 5:
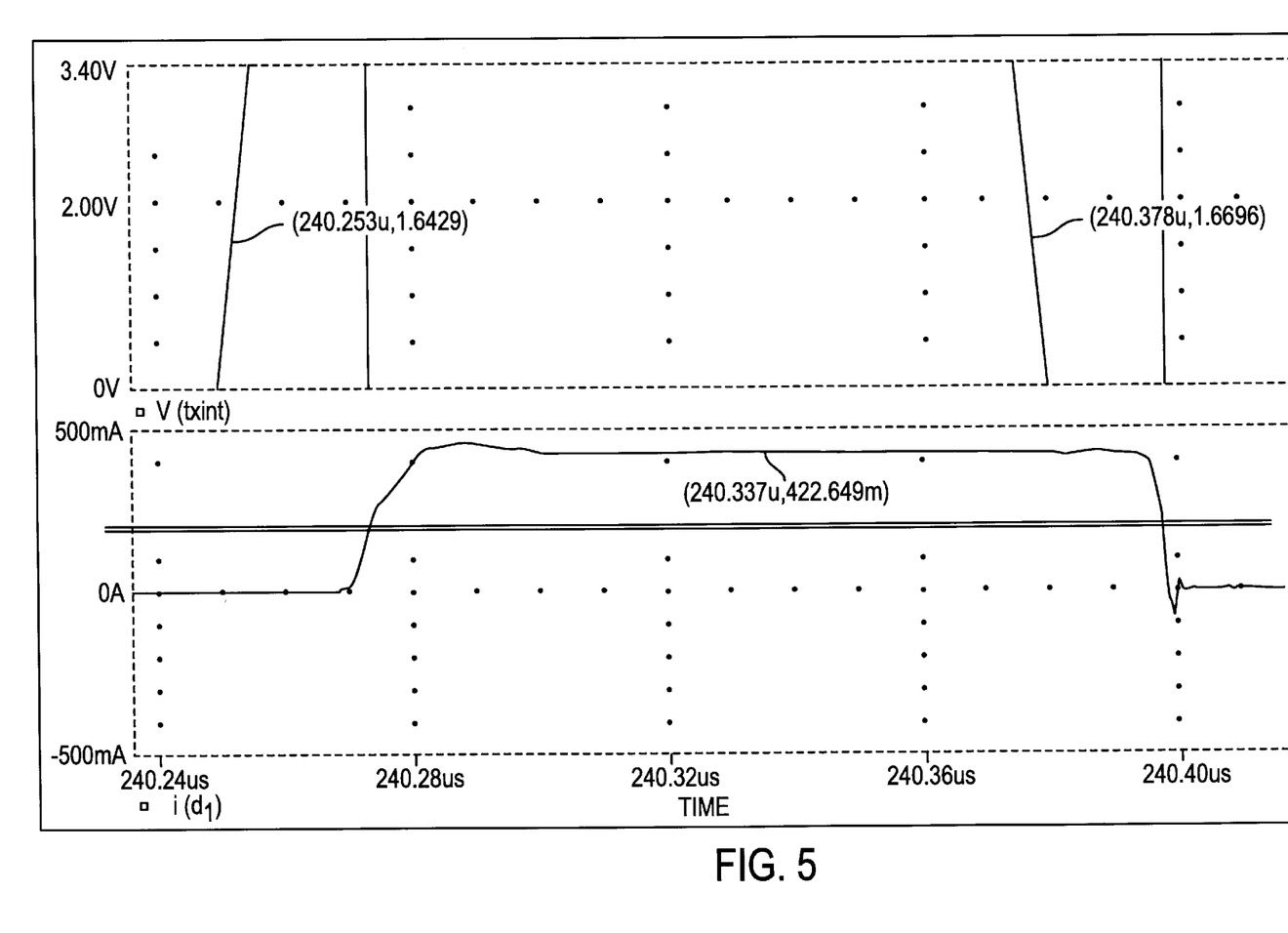
FIG. 5 depicts graphs delineating the voltage of the input activation signal and the current of the output current both as a function of time.

Connected to the charge and discharge circuits X1 and X2 of the current generating circuit 13 is an output circuit 30 comprising a plurality of transistors which define multiple current mirror circuits 32. Note FIGS. 3 and 4. In operation, the output circuit 30 serves for generating an output current $I_{out}$ at the output node. Such output current $I_{out}$ initiates within a first delay after the detection of the activation signal by the charge circuit X1 and terminates within a second delay after the detection of the cessation of the receipt of the activation signal by the discharge circuit X2. The first delay and the second delay thus translate into pulse width variation of the output current $I_{out}$, respectively. See FIG. 5. It is imperative that the first delay and the second delay be substantially similar since, by this similarity, a pulse width of the output current $I_{out}$ is substantially similar to a pulse width of the activation signal received at the enable node EN. In one embodiment, the output current $I_{out}$ is effectively controlled within +/−10% of the activation signal.

A first current mirror circuit 34 is shown to include a pair of PMOS transistors MP1 and MP2 connected to the output of the charge circuit X1 in a manner shown in FIG. 4. Specifically, the PMOS transistors MP1 and MP2 of the first current mirror circuit 34 have interconnected gate terminals which are in turn connected to the output of the charge circuit X1. One of the instant PMOS transistors MP1 has a drain terminal connected to the output of the charge circuit X1 while both transistors have source terminals that are tied to VCC. In use, the PMOS transistors MP1 and MP2 of the first current mirror circuit 34 are adapted for generating a first mirrored current $I_{M1}$ in response to the charge current $I_C$. Ideally, the current PMOS transistors MP1 and MP2 have a ratio of 10:1, thereby effecting the calculation of the first mirrored current $I_{M1}$ as follows: $I_{M1} = Id_{MP2} = 10*I_C$.

Also included is a second current mirror circuit 36 comprising a pair of PMOS transistors MP3 and MP4 and a pair of NMOS transistors MN3 and MN4 connected to the output of the discharge circuit X2. In particular, the instant PMOS transistors of the second current mirror circuit 36 have interconnected gate terminals which are in turn connected both to the output of the discharge circuit X2 and a drain terminal of one of the instant PMOS transistors MP3. Similar to the PMOS transistors MP1 and MP2 of the first current mirror circuit 34, source terminals of the PMOS transistors MP3 and MP4 of the second current mirror circuit 36 are tied to VCC. With attention now to the NMOS transistors MN3 and MN4 of the second current mirror circuit 36, the same have interconnected gate terminals which are further connected to both a drain terminal of one of the instant NMOS transistors MN3 and a drain terminal of one of the PMOS transistors MP4 of the second current mirror circuit 36. Lastly, a drain terminal of the NMOS transistor MN4 of the second mirror circuit 36 is connected to a drain terminal of the PMOS transistor MP2 of the first mirror circuit 34. Further, source terminals of the instant NMOS transistors MN3 and MN4 are each tied to GND. By this structure, the NMOS transistors serve for generating a second mirrored current $I_{M2}$ in response to the discharge current $I_D$ from the output of the discharge circuit X2. Preferably, the transistors MP3, MP4, MN3 and MN4 of the second current mirror circuit 36 are specifically sized to effect the calculation of the second mirrored current $I_{M2}$ as follows: $I_{M2} = Id_{MN4} = (24/16)*(28/2)*I_D = 21*I_D$.

Connected to the first and second current mirror circuits 34 and 36 is a third current mirror circuit 38 including a pair of NMOS transistors MN1 and MN2. The instant NMOS transistors MN1 and MN2 of the third current mirror circuit 38 have interconnected gate terminals which are in turn connected to the drain terminal of NMOS transistor MN4 and a drain terminal of one of the instant NMOS transistors MN1. In use, the NMOS transistors MN1 and MN2 of the third current mirror circuit 38 serve for generating an output current $I_{out}$ upon a difference current $I_A$ between the first mirrored current $I_{M1}$ and the second mirrored current $I_{M2}$ being positive. The output current $I_{out}$ is calculated $I_{out} = 20*Id_{MN1}$ and is ultimately determined by a magnitude of the charge current $I_C$ and multiplication ratios of the transistors MP1, MP2, MN1 and MN2 of the first current mirror circuit 34 and the third current mirror circuit 38. Further, upon the aforementioned difference current $I_A$ being negative, the NMOS transistors MN1 and MN2 of the third current mirror circuit 38 ensure that the output current $I_{out}$ is zero.

As mentioned hereinabove, it imperative that the first delay and the second delay remain substantially similar since such delays translate directly into pulse width variation of the output current $I_{out}$. By maintaining the rise and fall times of the output current $I_{out}$ equal, a pulse width of the output current $I_{out}$ remains substantially similar to a pulse width of the activation signal received at the enable node EN. To accomplish the foregoing, the charge circuit X1 and the discharge circuit X2 are matched to exhibit substantially similar delays which contribute equally to the first delay and the second delay. For a similar purpose, the transistors of the first current mirror circuit 34 are selected to equally load the charge circuit X1 and the discharge circuit X2. Further, the size of the transistors of the first, second and third current mirrors are each selected to ensure that delays are contributed equally to the first delay and second delay thus affording an output current $I_{out}$ with matching rise and fall times. In one embodiment, the transistors are sized as specifically indicated in FIG. 4 to accomplish the foregoing objective.

Finally, a feedback circuit 39 is connected between the current mirror circuits and the feedback node V1. As shown in FIG. 4, the feedback circuit 39 includes an NMOS transistor MN5 having a gate terminal connected to the gate terminals of the NMOS transistors MN1 and NM2 of the third current mirror circuit 38. Further, a source terminal of the present NMOS transistor MN5 is connected to GND while a drain terminal thereof is connected to the feedback node V1 via an inverter 40. Lastly, a resistor R1 is connected between VCC and the drain terminal of the NMOS transistor MN5. For reasons that will soon become apparent, the ohmic value of resistor R1 determines a magnitude $I_{out}$ (trip) of the output current $I_{out}$ at which the feedback signal is generated by the following equation: $I_{out}$ (trip)=10*(VCC/R1). While the value of the foregoing magnitude is not particularly critical, the following condition must be met: 0 mA<<$I_{out}$ (trip)<<400 mA. For example, in the present design, an R1 of 2 kΩ and a VCC of 3.3V renders an Iout (trip) of 16.5 mA. In summary, the feedback circuit 39 serves for transmitting the activation signal to the inputs of the gates of the first and second digital circuit 16 and 18 upon the output current Iout being at least a predetermined amount.

During operation, it is desired that an EN="1" effects the driving of the infrared light emitting diode D1 and an EN="0" precludes current flow to the infrared light emitting diode D1. Further, it should be noted that EN1="0" and ENB1="0" effect the generation of the charge and discharge currents $I_C$ and $I_D$ by the charge and discharge circuits, respectively. In contrast, EN1="1" and ENB1="1" allow the charge and discharge circuits X1 and X2 to remain idle. At power-up, EN="0" and therefore the outputs EN1 and ENB1 of digital circuits 18 and 16 are both "1", thereby transmitting "off" signals to the associated charge and discharge circuits X1 and X2. In the present state, $I_{out}$=0, V1=0, and the present invention consumes no quiescent current.

Once the enable node EN is triggered by the support circuit 12 and EN is "1", EN1="0" to transmit the "on" signal to the charge circuit X1 and ENB1="1" to continue to transmit the "off" signal to the discharge circuit X2. In the current state, the charge circuit X1 generates a current of 2 mA while the first current mirror circuit 34, in turn, generates a first mirrored current $I_{M1}$ of 20 mA. With the absence of any current from the discharge circuit X2, the first mirrored current $I_{M1}$ charges the gate capacitance of the NMOS transistor MN2 to both generate the output current $I_{out}$ and further switch the feedback node from V1="0" to V1="1". It should be noted that due to the turn-on delays associated with the charge circuit X1, the first current mirror circuit 34, and the third current mirror circuit 38, the output current $I_{out}$ exhibits a corresponding delay of about 20 ns. As an option, in one embodiment, the delay contributed by the third current mirror circuit 38 is dependent on the size ratio of the associated transistors which, in the present embodiment, is 1:20 to effect a rise time of 8 ns.

At the instant that EN="0" once again, the output current $I_{out}$ still exists and, therefore, V1="1". This condition of the feedback node V1 allows EN1="0" and ENB1="0" which in turn allows the charge circuit X1 and the discharge circuit X2 to generate both the charge current $I_C$ and the discharge current $I_D$, respectively. While the charge circuit X1 and first current mirror circuit 34 continues to generate the first mirrored current $I_{M1}$ of 20 mA, the discharge circuit X2 and the second current mirror circuit 36 generate a second mirrored current $I_{M2}$ of 42 mA. The third current mirror circuit 38 thus accepts a difference current $I_A$ between the first mirrored current $I_{M1}$ and the second mirrored current $I_{M2}$ which amounts to 22 mA. With such difference current $I_A$ being negative, $I_{out}$=0 and the present invention reverts to the initial state. Similar to the previous state, the turn-off delays associated with the discharge circuit X2, the second current mirror circuit 36, and the third current mirror circuit 38 manifests itself in a corresponding Iout delay time of about 20 ns.

As to the manner of usage and operation of the present invention, the same should be apparent from the above description. Accordingly, no further discussion relating to the manner of usage and operation will be provided.

Although only a few embodiments of the present invention have been described in detail herein, it should be understood that the present invention could be embodied in many other specific forms without departing from the spirit or scope of the invention.

Therefore, the present examples and embodiments are to be considered as illustrative and not restrictive, and the invention is not to be limited to the details given herein, but may be modified within the scope of the appended claims.

What is claimed is:

1. An apparatus comprising:
   a current generating circuit connected to an enable node and adapted to generate a first current upon the receipt of an activation signal at the enable node and further generate a second current upon the cessation of the receipt of the activation signal at the enable node; and
   an output circuit connected between an output node and the current generating circuit for generating an output current at the output node in response to the first current and the second current, the output circuit generating the output current such that the output current is initiated within a first delay after the detection of the activation signal by the current generating circuit and is terminated within a second delay after the detection of the cessation of the receipt of the activation signal by the current generating circuit, wherein the first delay and the second delay are substantially similar such that a pulse width of the output current is substantially similar to a pulse width of the activation signal received at the enable node.

2. The apparatus as set forth in claim 1, wherein the current generating circuit includes:
   a charge circuit connected to the enable node and adapted to generate a charge current upon the receipt of the activation signal at the enable node; and
   a discharge circuit connected to the enable node and adapted to generate a discharge current upon the cessation of the receipt of the activation signal at the enable node.

3. The apparatus as set forth in claim 2, wherein the charge circuit and the discharge circuit are matched to exhibit substantially similar delays in order to ensure that the first delay and the second delay are substantially similar.

4. The apparatus as set forth in claim 2, comprising a logic circuit connected between the enable node and the charge and discharge circuits for allowing the charge circuit to generate the charge current upon the receipt of the activation signal at the enable node and further allowing the discharge circuit to generate the discharge current upon the cessation of the receipt of the activation signal at the enable node.

5. The apparatus as set forth in claim 4, wherein the logic circuit is further connected to the output circuit for allowing the discharge circuit to generate the discharge current only while the output circuit is generating the output current.

6. The apparatus as set forth in claim 5, wherein the logic circuit is connected to the output circuit via an inverter.

7. The apparatus as set forth in claim 5, wherein the logic circuit is connected to a resistor which determines a magnitude of the output current at which the discharge circuit is allowed to generate the discharge current.

8. The apparatus as set forth in claim 5, wherein the logic circuit is connected to the output circuit via a transistor.

9. The apparatus as set forth in claim 5, wherein the logic circuit includes a NOR gate connected between the charge circuit, the enable node, and the output circuit.

10. The apparatus as set forth in claim 5, wherein the logic circuit includes a NAND gate connected between the discharge circuit, the enable node, and the output circuit.

11. The apparatus as set forth in claim 2, wherein the charge and discharge circuits each have zero current consumption while idle.

12. The apparatus as set forth in claim 2, wherein the output circuit includes a firs t current mirror circuit connected to the charge circuit for generating a first mirrored current upon the receipt of the charge current from the charge circuit and a second current mirror circuit connected to the discharge circuit for generating a second mirrored current upon the receipt of the discharge current from the discharge circuit.

13. The apparatus as set forth in claim 12, wherein the first current mirror circuit includes a pair of transistors which determine a magnitude of the first mirrored current.

14. The apparatus as set forth in claim 13, wherein the transistors of the first current mirror circuit equally load the charge circuit and the discharge circuit in order to ensure that the first delay and the second delay are substantially similar.

15. The apparatus as set forth in claim 13, wherein the second current mirror circuit includes at least one pair of transistors which determine a magnitude of the second mirrored current.

16. The apparatus as set forth in claim 15 wherein the first current mirror circuit includes a pair of PMOS transistors and the second current mirror circuit includes a pair of PMOS transistors and a pair of NMOS transistors.

17. The apparatus as set forth in claim 12, wherein the output circuit further includes a third current mirror connected to the first and second current mirror circuits for generating the output current upon a difference between the first mirrored current and the second mirrored current being positive and further remaining idle upon the difference between the first mirrored current and the second mirrored current being negative.

18. The apparatus as set forth in claim 17, wherein the first, second and third current mirrors each include at least a pair of transistors selected to ensure that the first delay and the second delay are substantially similar.

19. The apparatus as set forth in claim 17, wherein a magnitude of the second current mirrored current determines a level at which the difference changes from positive to negative.

20. The apparatus as set forth in claim 17, wherein multiplication ratios of the first current mirror circuit and the third current mirror circuit work in conjunction with the charge current to determine a magnitude of the output current.

21. The apparatus as set forth in claim 2, wherein the output circuit is connected to an infrared light emitting diode for driving the same with the output current.

22. A method comprising:

providing at least one circuit with an enable node and an output node;

generating a first current upon the receipt of an activation signal at the enable node;

generating a second current upon the cessation of the receipt of the activation signal at the enable node; and transmitting an output current from the output node in response to the first current and the second current, the output current having a pulse width that is substantially similar to a pulse width of the activation signal received at the enable node.

23. The method as set forth in claim 22, wherein the circuit includes an output circuit having a plurality of transistors.

24. The method as set forth in claim 23, comprising:

selecting the transistors of the output circuit to determine a magnitude of the output current.

25. The method as set forth in claim 23, comprising:

selecting the transistors of the output circuit to ensure that a rise time and a fall time of the output current match, thereby ensuring that the pulse width of the output current is substantially similar to the pulse width of the activation signal.

26. The method as set forth in claim 22, wherein the circuit includes a pair of controlled current sources.

27. The method as set forth in claim 26, comprising:

matching the current sources to ensure that a rise time and a fall time of the output current match, thereby ensuring that the pulse width of the output current is substantially similar to the pulse width of the activation signal.

28. The method as set forth in claim 22, comprising:

generating a feedback signal upon the transmission of the output current, wherein the discharge current is generated only upon the receipt of the feedback signal.

29. The method as set forth in claim 22, comprising:

connecting an infrared light emitting diode to the circuit for driving the infrared light emitting diode with the output current.

30. An apparatus comprising:

a charge circuit having an input and an output, the charge circuit adapted to generate at the output thereof a charge current during the receipt of an "on" signal at the input thereof and further remain idle during the receipt of an "off" signal at the input thereof;

a discharge circuit having an input and an output, the discharge circuit adapted to generate at the output thereof a discharge current during the receipt of an "on" signal at the input thereof and further remain idle upon the receipt of an "off" signal at the input thereof, wherein the discharge circuit is substantially similar to the charge circuit such that the charge and discharge circuits exhibit substantially similar delays;

a first digital circuit having an output connected to the input of the charge circuit for transmitting the "on" signal to the charge circuit upon the receipt of an activation signal on at least one of a pair of inputs thereof and further transmitting the "off" signal to the charge circuit upon the lack of receipt of the activation signal on both of the inputs thereof, wherein a first input of the first digital circuit is connected to an inverted enable node and a second input of the first digital circuit is connected to a feedback node;

a second digital circuit having an output connected to the input of the discharge circuit for transmitting the "on"

signal to the discharge circuit upon the receipt of the activation signal on both of a pair of inputs thereof and further transmitting the "off" signal to the discharge circuit upon the lack of receipt of the activation signal on at least one of the pair of inputs thereof, wherein a first input of the second digital circuit is connected to the inverted enable node and a second input of the second digital circuit is connected to the feedback node;

a first current mirror circuit including a pair of PMOS transistors connected to the output of the charge circuit for generating a first mirrored current upon the receipt of the charge current from the output of the charge circuit;

a second current mirror circuit including a pair of PMOS transistors and a pair of NMOS transistors connected to the output of the discharge circuit for generating a second mirrored current upon the receipt of the discharge current from the output of the discharge circuit;

a third current mirror circuit including a pair of NMOS transistors connected to the first and second current mirror circuits for generating an output current upon a difference between the first mirrored current and the second mirrored current being positive and further remaining idle upon the difference between the first mirrored current and the second mirrored current being negative; and a feedback circuit connected between the current mirror circuits and the feedback node for transmitting the activation signal to the inputs of the first and second digital circuits upon the output current being at least a predetermined amount;

said first and third current mirror circuits being chosen to selectively determine a magnitude of the output current;

said charge and discharge circuits being substantially identical to ensure that a rise time and a fall time of the output current match, thereby ensuring that a pulse width of the output current is substantially similar to a pulse width of the activation signal;

said transistors of the first mirror circuit equally loading the charge and discharge circuits to ensure that the rise time and the fall time of the output current match, thereby ensuring that the pulse width of the output current is substantially similar to the pulse width of the activation signal;

said transistors of the first, second and third mirror circuit being chosen to ensure that the rise time and the fall time of the output current match, thereby ensuring that the pulse width of the output current is substantially similar to the pulse width of the activation signal.

* * * * *